(12) United States Patent
Li et al.

(10) Patent No.: US 7,801,157 B2
(45) Date of Patent: Sep. 21, 2010

(54) METHODS AND SYSTEMS FOR PROCESSING CALLS IN A PACKET NETWORK USING PEER CALL SERVERS

(75) Inventors: Xuewen Li, Cary, NC (US); Allan Jeffrey Hinchey, Kanata (CA); David P. Ress, Cary, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1853 days.

(21) Appl. No.: 10/852,890

(22) Filed: May 25, 2004

(65) Prior Publication Data
US 2005/0008005 A1 Jan. 13, 2005

Related U.S. Application Data

(63) Continuation of application No. 09/507,277, filed on Feb. 18, 2000, now Pat. No. 6,775,277.

(51) Int. Cl.
*H04L 12/56* (2006.01)
(52) U.S. Cl. .................. 370/401; 370/352; 370/389
(58) Field of Classification Search ......... 370/352–357, 370/389, 401
See application file for complete search history.

(56) References Cited

U.S. PATENT DOCUMENTS

| | | | | |
|---|---|---|---|---|
| 6,069,890 A * | 5/2000 | White et al. | ................. | 370/352 |
| 6,101,539 A | 8/2000 | Kennelly et al. | | |
| 6,353,610 B1 * | 3/2002 | Bhattacharya et al. | ...... | 370/352 |
| 6,360,265 B1 | 3/2002 | Falck et al. | | |
| 6,373,857 B1 | 4/2002 | Ma | | |
| 6,374,302 B1 * | 4/2002 | Galasso et al. | .............. | 709/238 |
| 6,418,139 B1 | 7/2002 | Akhtar | | |
| 6,483,912 B1 * | 11/2002 | Kalmanek et al. | ........... | 379/219 |
| 6,501,761 B1 * | 12/2002 | Pannell et al. | ............... | 370/403 |
| 6,523,696 B1 | 2/2003 | Saito et al. | | |
| 6,539,021 B1 * | 3/2003 | Kennelly et al. | ............ | 370/401 |
| 6,801,952 B2 * | 10/2004 | Belzile | ....................... | 709/249 |
| 6,885,658 B1 * | 4/2005 | Ress et al. | .................. | 370/352 |

(Continued)

FOREIGN PATENT DOCUMENTS

WO 98/47298 10/1998

OTHER PUBLICATIONS

Anquetil, L-P. et al., "Media Gateway Control Protocol and Voice over IP Gateways," Alcatel Telecommunications Review, 2nd Quarter, 1999, pp. 50-56, XP-000830045.

(Continued)

*Primary Examiner*—Fan Tsang
*Assistant Examiner*—Simon King
(74) *Attorney, Agent, or Firm*—Withrow & Terranova, PLLC

(57) ABSTRACT

A method for processing calls in a packet network using peer call servers includes receiving a setup message from a first gateway in the packet network. The setup message includes a first address for a called endpoint. The call server that receives the setup message translates the message into a call server ID and an endpoint ID specifying the remote call server corresponding to the called party. The call server sends the call server ID and the endpoint ID to the remote call server. The remote call server obtains a call signaling transport address to the called end user based in the endpoint ID.

15 Claims, 7 Drawing Sheets

U.S. PATENT DOCUMENTS

| | | | | |
|---|---|---|---|---|
| 7,068,647 | B2* | 6/2006 | Fangman et al. | 370/352 |
| 7,215,643 | B2* | 5/2007 | Mussman et al. | 370/237 |
| 7,346,044 | B1* | 3/2008 | Chou et al. | 370/352 |
| 2003/0002512 | A1* | 1/2003 | Kalmanek et al. | 370/401 |
| 2003/0219011 | A1* | 11/2003 | Han | 370/352 |

OTHER PUBLICATIONS

Hoshi, Tohru, Tanigawa, Keiko, and Tsukada, Koji, "Voice Streem Multiplexing between IP Telephony Gateways," IEICE Trans. Inf. & Syst., vol. E82-D, No. 4, Apr. 1999, XP-000832566.

Huitema, Christian et al., "An Architecture for Residential Internet Telephony Service," IEEE Network, May/Jun. 1999, pp. 151-157, XP-000870631.

Leung, Kin, "An Update Algorithm for Replicated Signaling Databases in Wireless and Advanced Intelligent Networks," IEEE Transaction on Computers, vol. 46, No. 3, Mar. 1997, pp. 362-367, XP-002169396.

Rosenberg, J., and Schulzrinne, H., "An RTP Payload Format for User Multiplexing," Internet Engineering Task Force Internet Draft, May 6, 1998, XP-002177217.

Subbiah, B. and Sengodan, S., "User Multiplexing in RTP Payload Between IP Telephony Gateways," Internet Engineering Task Force Internet Draft, Aug. 21, 1998, XP-002127741.

* cited by examiner

METHODS AND SYSTEMS FOR PROCESSING CALLS IN A PACKET NETWORK USING PEER CALL SERVERS

PRIORITY APPLICATION INFORMATION

This application claims the benefit of U.S. Provisional Patent Application Ser. No. 60/137,661, filed Jun. 4, 1999, the disclosure of which is incorporated herein by reference in its entirety. The present application is a continuation of U.S. application Ser. No. 09/507,277, filed Feb. 18, 2000, allowed, and which is hereby incorporated by reference in its entirety.

TECHNICAL FIELD

The present invention relates to methods and systems for processing calls in a packet network. More particularly, the present invention relates to methods and systems for processing calls in a packet network using peer call servers implementing half call modeling.

BACKGROUND ART

When a network, such as a voice over Internet protocol (IP) network, grows to a certain size, a single call server cannot handle all of the call signaling traffic. As used herein, the term call server refers to an entity that performs call signaling functions in a voice over IP network. Examples of call servers include gatekeepers that implement ITU Recommendation H.323, connection managers that communicate with media gateways, according to the media gateway control protocol (MGCP), and proxy servers that implement the session initiation protocol (SIP). In order to handle the increased call traffic when a network grows to a certain size, it is desirable to utilize multiple call servers to perform call signaling operations for both capacity and reliability reasons.

When multiple call servers, i.e., two or more call servers, are operating within a network, routing and translation data, such as the mappings from numbering plan addresses, such as private numbering plan addresses, public numbering plan addresses, or E.164 addresses, to call signaling transport addresses, must be made available among multiple peer call servers. In addition, messages transported between peer call servers must be handled in an efficient manner. As used herein, the term peer call servers refers to a group of call servers that perform call processing functions as peers, rather than as clients and servers. If any of the above-mentioned operations that are to be performed by peer call servers require significant amounts of time and/or network traffic, the network will not work efficiently. Accordingly, there exists a need for novel methods and systems for efficiently performing call processing operations using a plurality of peer call servers.

Another problem associated with using multiple call servers to process calls in a packet network is to ensure that call servers are provisioned with translation information, such as E.164 address translation information, in a reliable, consistent, and efficient manner. For example, when an endpoint hosted by one call server moves to a location hosted by another call server, a reliable mechanism for updating the translation information in every affected call server is preferably provided. Accordingly, there exists a need for novel methods and systems for reliably, consistently, and efficiently provisioning call servers with translation information for hosted and non-hosted endpoints.

DISCLOSURE OF THE INVENTION

According to one aspect of the present invention, network translation information is generated and distributed among call servers in a network. A packet telephony manager (PTM) generates network translation information to be stored by each of the call servers. The network translation information includes a call server ID and an endpoint ID. Each call server ID uniquely identifies a call server. Each endpoint ID uniquely identifies an endpoint hosted by the call server. The PTM can also include a graphical user interface (GUI) that allows a network administrator to monitor and alter the network translation information transmitted to the call servers.

According to another aspect, the present invention includes a method for translating a directory number into a call signaling transport address using multiple call servers. The method includes receiving a SETUP message at a first call server in a packet network. The SETUP message includes a directory number for a called end user in an interne protocol (IP) communication. In response to receiving the SETUP Message, a translation is executed to obtain a list of entity addresses corresponding to the directory number. Each entity address includes a call server ID for a second call server and an endpoint ID for the endpoint to which a call is sought to be routed. A terminating SETUP message including the call server ID and the endpoint ID is then transmitted to the second call server. The second call server determines a call signaling transport address for the entity to which the call is to be routed based on the endpoint ID.

Accordingly, it is an object of the present invention to provide novel methods and systems for processing calls in a packet network using a plurality of call servers.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

According to one embodiment of the present invention, network translation information for all call servers in a network is stored in each call server in the network to increase the efficiency of call completion. As used herein, the term network translation information refers to information usable by call servers to locate network endpoints. In a preferred embodiment of the invention, the network translation information includes a call server ID that uniquely identifies each call server, an endpoint ID that uniquely identifies endpoints hosted by each call server, and a mapping from an alias, e.g., an E.164 address, to the call server and endpoint ID for an endpoint The call servers use this network translation information to translate aliases, such as E.164 addresses, to call signaling transport addresses. The methods and systems for generating, distributing, and utilizing the network translation information will now be described in more detail.

Figure 1:
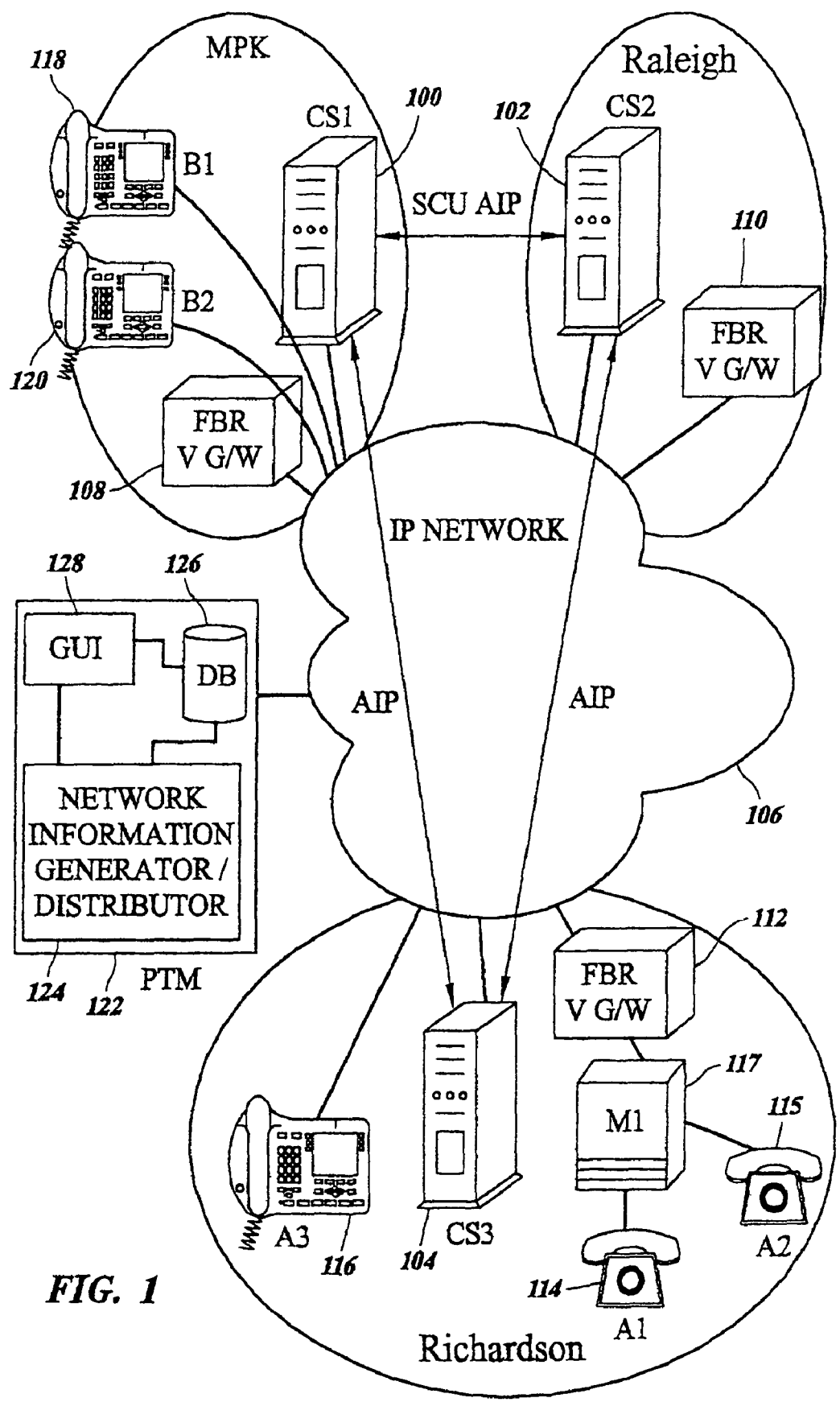
FIG. 1 is a network diagram illustrating methods and systems for establishing calls in a packet network using peer call servers according to an embodiment of the present invention.

FIG. 1 illustrates an exemplary network in which call servers each store network translation information and utilize the network translation information to locate endpoints. In FIG. 1, a first call server 100 may be located in Mission Park (MPK) Calif., another call server 102 may be located in Raleigh, N.C., and a third call server 104 may be located in Richardson, Tex. Each of the call servers 100-104 may be configured as previously described. For example, each call server may implement H.323, MGCP, SIP, or other IP telephony protocol. Suitable hardware for each call server includes a general purpose computer equipped with a network adapter card such as an Ethernet card. Call servers 100-104 communicate with each other to perform call processing functions. Inter-call server communications occur according to an agent interworking protocol, which will be discussed in more detail below.

In order to provide IP connectivity for end user devices, gateways 108-112 translate from time division multiplexed (TDM) communications used by traditional telephony devices to IP packets, and vice versa. In the illustrated embodiment gateways 108-112 comprise Fast Branch Router voice gateways. Gateways 108-112 allow end user devices, such as end user devices 114 and 115 to connect to other end user devices over IP network 106. End user devices 114 and 115 may comprise public switched telephone network (PSTN) terminals that connect to gateway 112 through private branch exchange (PBX) 117. Other end user devices, such as end user devices 116-120, include IP functionality that allows an end user to connect directly to IP network 106 without an intermediate gateway. For example, end user devices 116-120 may comprise IP terminals.

Provisioning

According to an important aspect of the invention, a packet telephony manager (PTM) 122 generates network translation information and distributes the network translation information to call servers 100-104. In the illustrated embodiment, packet telephony manager 122 comprises software capable of executing on a general purpose computer including appropriate network communications hardware, such as an Ethernet card, for distributing the network translation information to call servers 100-104 over IP network 106. Packet telephony manager 122 includes network translation information generator/distributor 124 for generating the network translation information and storing the network translation information in network translation information database 126. Network translation information generator/distributor 124 preferably also distributes the network translation information to call servers 100-104. Graphical user interface 128 allows a network administrator to control the building and generation of the network translation information. Advantages of generating and distributing network translation information from a central location include ease of updating network translation information when call servers and/or endpoints are added to the networks removed from the network, or moved to a new location.

Figure 2:
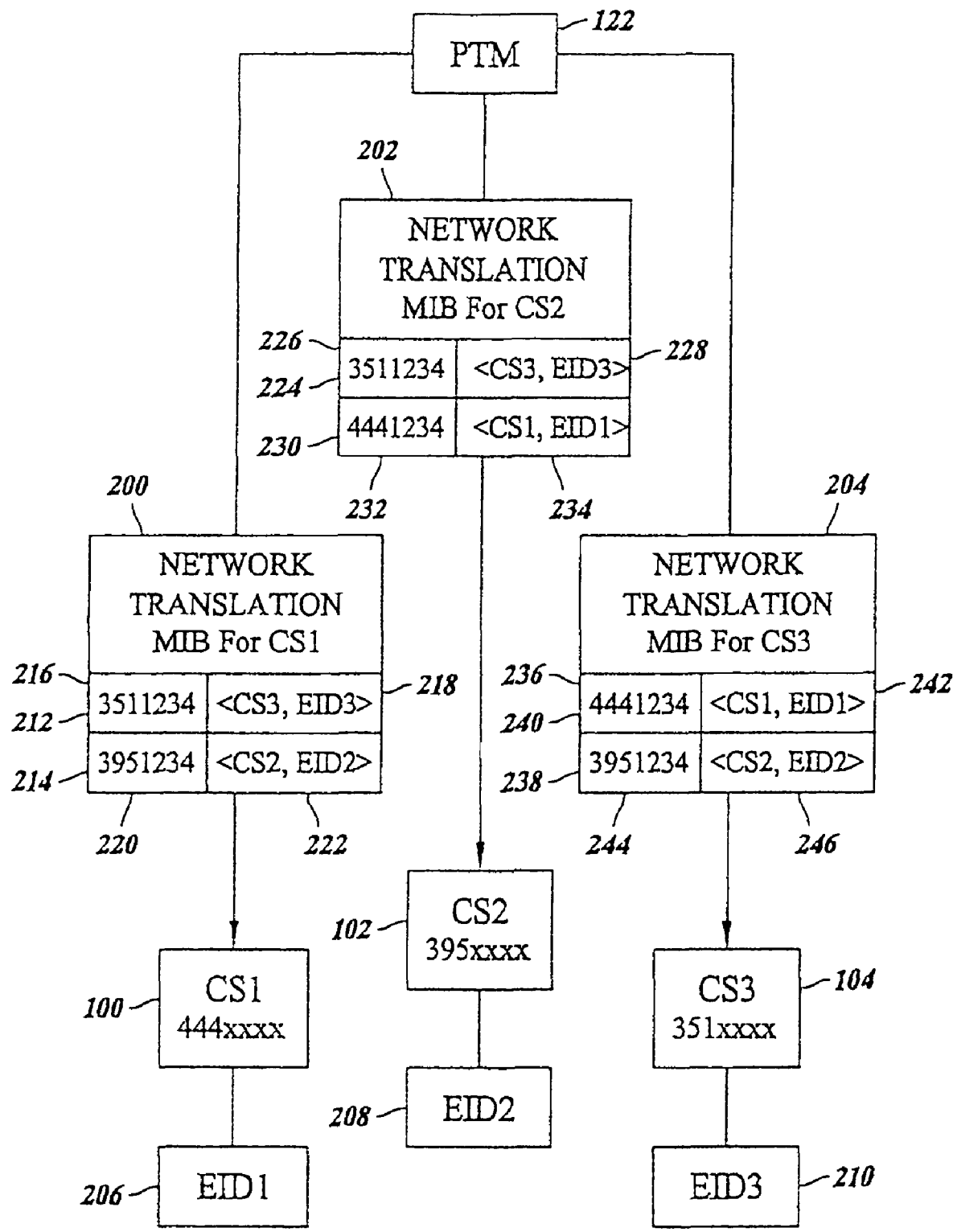
FIG. 2 is a block diagram illustrating the provisioning of network translation information on call servers according to an embodiment of the present invention.

FIG. 2 illustrates exemplary network translation information that can be created by packet telephony manager 122 and distributed to each of the call servers 100-104 illustrated in FIG. 1. In FIG. 2, packet telephony manager 122 generates Simple Network Management Protocol (SNMP) management information bases (MIBS) 200, 202, and 204 to be transmitted to call servers 100, 102, and 104, respectively. The MIB distributed to each call server includes network translation information for clients, such as gateways and terminals, connected to the other call servers. PTM 122 preferably also provisions call servers 100-104 with network translation information for endpoints hosted by each call server. For example, in the illustrated embodiment, call server 100 serves endpoints having private numbering plan addresses 444xxxx. In the illustrated embodiment, a single endpoint 206 having a private numbering plan address of 4441234 is shown. Call server 102 serves endpoints having private numbering plan addresses 395xxxx. In the illustrated embodiment, a single endpoint 208 having a private numbering plan address of 3951234 is shown. Call server 104 serves endpoints having private numbering plan addresses 351xxxx. In the illustrated embodiment, a single endpoint 210 having a private numbering plan address of 3511234 is shown. Accordingly, MIB 200 for call server 100 includes routing information for endpoints 208 and 210 hosted by call servers 102 and 104. More particularly, MIB 200 includes a first entry 212 that contains network translation information for endpoint 210 hosted by call server 104. MIB 200 includes a second entry 214 containing network translation information for endpoint 208 hosted by call server 102.

First entry 212 of MIB 200 includes a first field 216 that contains the E.164 address of endpoint 210 connected to call server 104 and a second field 218 that contains a call server ID CS3 and an endpoint ID EID3 for endpoint 210. This combination of call server ID and endpoint ID is unique within the network. In addition, the endpoint ID itself is preferably unique so that endpoints can be moved from one call server to another call server without having to obtain a new endpoint ID. Packet telephony manager 122 preferably ensures this uniqueness.

Second entry 214 in MIB 200 includes a first field 220 containing a private numbering plan address 3951234 corresponding to endpoint 208, and a second field 222 that stores call server ID CS2 and endpoint ID EID2 for call server 102 and endpoint 208. Thus, MIB 200 distributed to call server 100 contains all of the network translation data for endpoints hosted by call server 102 and call server 104.

MIB 202 distributed to call server 102 includes network translation data for endpoints hosted by call server 100 and call server 104. In the illustrated embodiment, MIB 202 includes a first entry 224 for endpoint 210 connected to call server 104. First entry 224 includes a first field 226 for storing the private numbering plan address 3511234 of endpoint 210. First entry 224 includes a second field 228 for storing the endpoint ID and call server ID for endpoint 210. In the illustrated embodiment, the call server ID is CS3 and endpoint ID is EID3.

MIB 202 includes a second entry 230 that contains network translation data for endpoint 206 hosted by call server 100. In the illustrated embodiment, second entry 230 includes a first field 232 for storing the private numbering plan address of endpoint 206. In this example, the private numbering plan address for endpoint 206 is 4441234. Second entry 230 includes second field 234 for storing the endpoint ID and call server ID for endpoint 206. In the illustrated embodiment, the endpoint ID for endpoint 206 is EID1 and the call server ID for endpoint 206 is CS1. Thus, MIB 202 created for call server 102 contains all of the network translation data for endpoints connected to call server 100 and call server 104.

MIB 204 created for call server 104 includes network translation data for endpoints connected to call server 100 and call server 102. In the illustrated embodiment, MIB 204 includes a first entry 236 for endpoint 206 and a second entry 238 for endpoint 208. First entry 236 includes a first field 240 for storing the private numbering plan address of 4441234 of endpoint 206. First entry 236 includes a second field 242 containing the call server ID and endpoint ID for endpoint 206. In the illustrated embodiment, the call server ID for endpoint 206 is CS1 and the endpoint ID is EID1. Second entry 238 includes a first field 244 storing the private numbering plan address 3951234 of endpoint 208 and a second field 246 storing the call server ID and the endpoint ID of endpoint 208. In the illustrated embodiment, the call server ID is CS2 and the endpoint is EID2 for endpoint 208.

Thus, in the illustrated embodiment, each call server is provisioned with network translation information for endpoints connected to the other call servers. The network translation information is used by call servers to avoid double translation of public or private numbering plan addresses and thereby increase call processing efficiency. In addition, because the network translation information is created and generated by a central packet telephony manager, consistency of network translation information is ensured. For example, when a new call server is added to the network, packet telephony manager 122 updates the MIBs in its local database and transmits new MIBs to all of the call servers in the network. A similar action occurs when a call server or an endpoint is removed from the network. When an endpoint moves from one call server to another call server, there is no need to generate a new endpoint ID for the endpoint because endpoint IDs are preferably unique in the network. The only action required is to update the translation data stored by PTM 122 and forward the updated translation data to the call servers.

Figure 3:
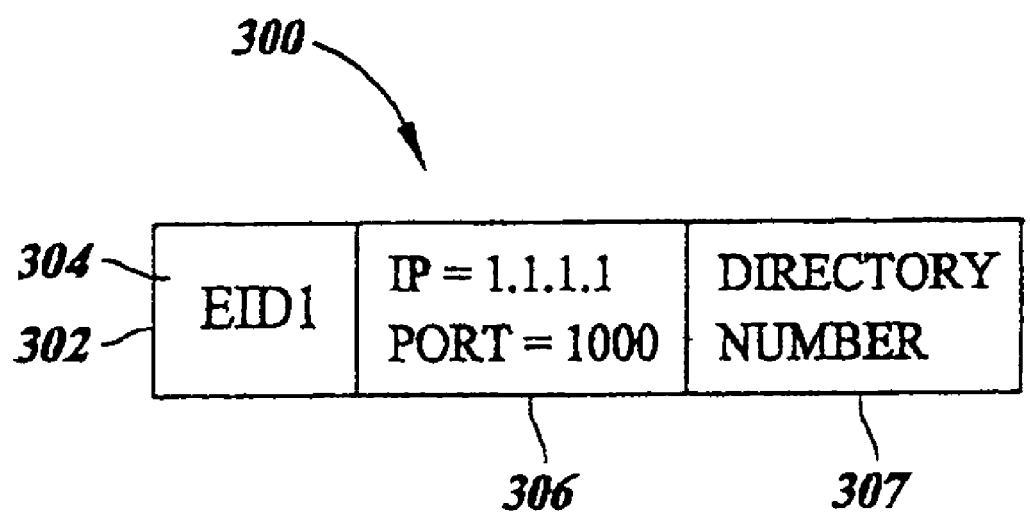
FIG. 3 is a block diagram illustrating exemplary local translation information that can be distributed to a call server according to an embodiment of the present invention.

In addition to network translation data for endpoints hosted by other call servers, each call server stores translation data for hosted endpoints. The local translation data for each call server can include an endpoint ID and a call signaling transport address (CSTA) corresponding to each endpoint ID referenced by the directory number or number ranges assigned to the endpoint. FIG. 3 illustrates an example of a local translation data that may be stored by call server 100. In FIG. 3, local translation data 300 includes an entry 302 for endpoint 206. Entry 302 includes a first field 304 for storing the endpoint ID EID1 of endpoint 206, a second field 306 for storing the CSTA of endpoint 206, and a third field 307 for storing the directory number of endpoint 206. The CSTA specifies the location on the packet network for sending call signaling information for a given endpoint. In FIG. 3, each CSTA includes an IP address and a port number to which call signaling information for a given endpoint is to be sent. If the endpoint is an IP terminal, the IP address and port number may be those assigned to the IP terminal. If the endpoint is a gateway, the IP address and port number can be an IP address and a port number on the gateway.

Local translation data similar in structure to the local translation data illustrated in FIG. 3 can also be generated by call servers 102 and 104 or generated by PTM 122 and sent to call servers 102 and 104 for endpoints hosted by those call servers. For example, call server 102 may generate or receive an endpoint ID, call signaling transport address, and directory number for endpoint 208. Call server 104 may generate or receive a call signaling transport address, endpoint ID, and directory number for endpoint 210. The local translation data can be generated by packet telephony manager 122 to ensure consistency and facilitate updating of the local translation information.

Figure 4:
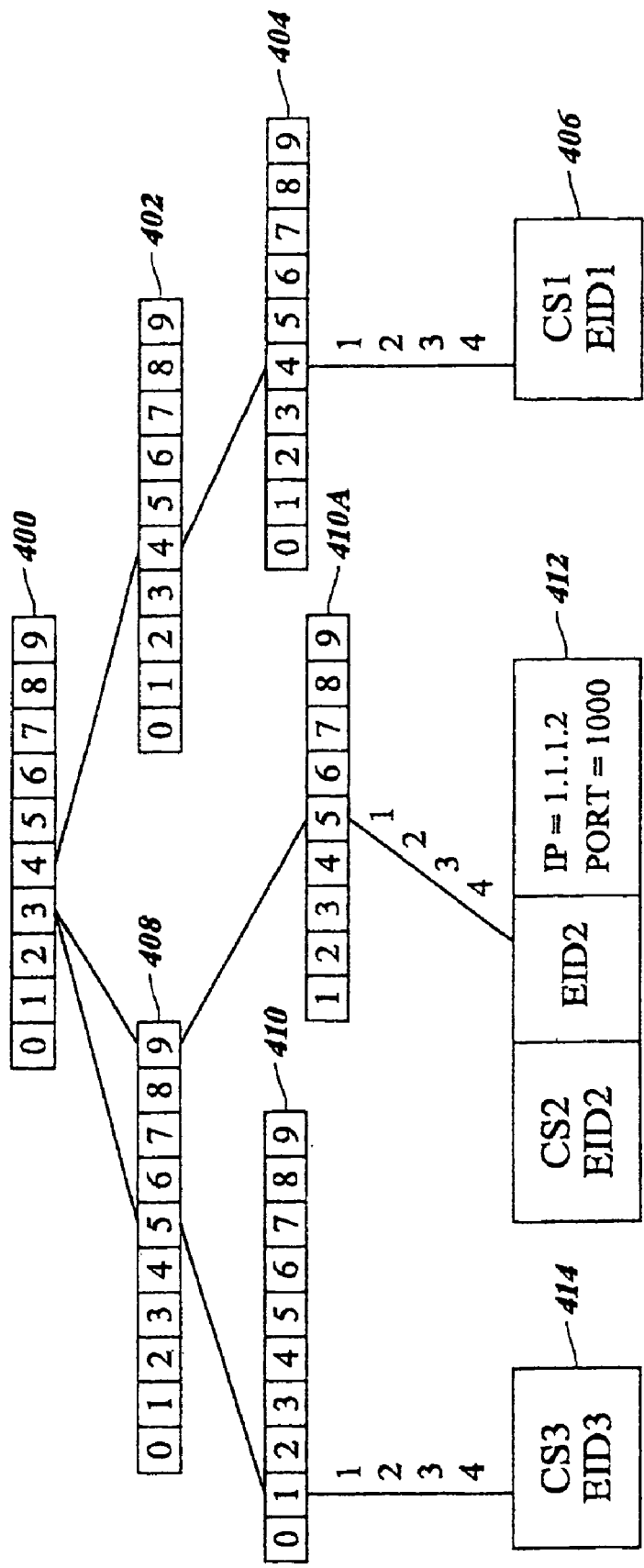
FIG. 4 is a block diagram illustrating an exemplary digilator tree that can be created by a call server according to an embodiment of the present invention.

Once each call server obtains the network and local translation information from PTM 122, each call server creates a database that maps directory number or number ranges to unique network IDs. In a preferred embodiment, the database comprises a digilator tree that maps the numbering plan address to one or more call server and endpoint IDs. FIG. 4 illustrates an exemplary digilator tree according to an embodiment of the present invention. The digilator tree illustrated in FIG. 4 may be constructed by call server 102 illustrated in FIG. 2 based on MIB 202. In the digilator tree, in FIG. 4, each branch of the tree is traversed by E.164 digits that may be received by the call server in a call signaling message, such as a SETUP message. For example, if call server 102 receives a call directed to private numbering plan address 4441234, the first "4" in the address causes a logical transition to the "4" position in branch 400. The second "4" in the called number causes a transition from the "4" position in the branch 400 to the "4" position in branch 402. The third "4" in the address causes a transition from the "4" position in branch 402 to the "4" position in branch 404. The remaining digits in the address eventually lead to a leaf 406 which contains the call server ID and endpoint ID for the endpoint corresponding to the dialed digits. This call server ID and endpoint ID correspond to endpoint 206, which is hosted by call server 100. The call server ID and endpoint ID are sent to call server 100 and utilized by call server 100 to locate the call signaling transport address of endpoint 206 using its local translation data.

Although the illustrated embodiment returns a single call server ID and endpoint ID, in a preferred embodiment of the invention, a routing list containing a plurality of call server IDs corresponding to the endpoint ID is returned. Returning a plurality of call server IDs corresponding to the endpoint ID allows the call server that receives the message to choose among call servers if one or more of the call servers fails. This feature increases the reliability of completing calls over an IP network.

Referring back to FIG. 4, if call server 102 receives a message containing the private numbering plan address 3951234, the first "3" in the address causes a logical transition to digit "3" in branch 400. The second digit in the called number causes a transition from "3" in branch 400 to "9" in branch 408. The third digit in the called number causes a transition from "9" in branch 408 to "5" in branch 410A. The remaining digits in the called number cause transitions that eventually lead to leaf 412. Leaf 412 contains a reference to call server 102, implying the endpoint is hosted locally. Local translation data is then used to look up the call signaling transport address for endpoint 208. In the illustrated example, the call signaling transport address includes an IP address of 1.1.1.2 and a port number of 1000. This information is used by call server 102 to route a call to endpoint 208, which is hosted by call server 102.

Finally, if call server 102 receives a message containing the dialed digits 3511234, these digits cause transitions through the digilator tree to leaf 414. Leaf 414 contains an endpoint ID and a call server ID for endpoint 210, which is hosted by call server 104. This information is transmitted to call server 104 and used by call server 104 to locate the call signaling transport address of endpoint 210.

The steps required to traverse the digilator tree illustrated in FIG. 4 can consume large amounts of call server processing resources, especially when a network grows to a certain size. In prior art systems, both the call server hosting the called endpoint and the call server hosting the calling endpoint were required to perform the translation based on the dialed digits. Call servers according to the present invention avoid double translations by having the call server hosting the calling party determine the call server ID and endpoint ID for the called endpoint. This information is then forwarded to the call server hosting the called endpoint The call server hosting the called endpoint is no longer required to make a second translation based on the dialed digits. Accordingly, the efficiency of message processing by call servers according to embodiments of the present invention is increased.

Call Processing

Once each call server is provisioned with endpoint IDs and call server IDs for all other agents and call servers in the network, the efficiency of call processing between peer call servers is increased.

Figure 5:
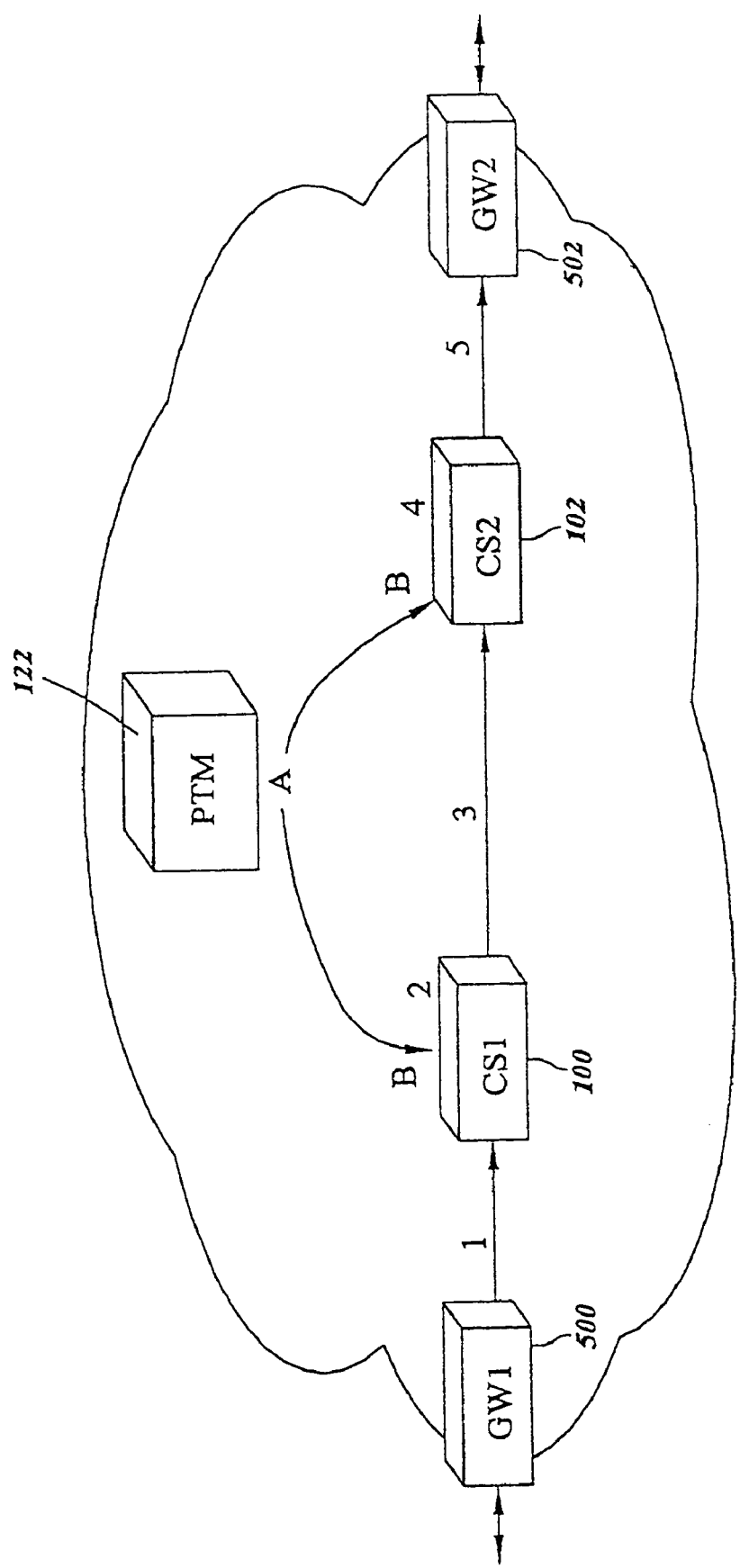
FIG. 5 is a call flow diagram illustrating exemplary call processing by peer call servers according to an embodiment of the present invention.

FIG. 5 illustrates call processing by peer call servers according to an embodiment of the present invention. In FIG. 5, PTM 122 includes functionality for generating network translation information, including endpoint IDs for gateways 500 and 502 and call server IDs for call servers 100 and 102. In step A, PTM 122 sends network translation data and configuration data for hosted endpoints to call servers 100 and 102. In step B, call servers 100 and 102 construct databases, such as digilator trees, to facilitate access to the network translation information.

In the illustrated call flow diagram, an end user device, such as a PTSN terminal, connected to gateway 500 attempts to place a call to an end user device connected to gateway 502. Accordingly, in step 1, gateway 500 transmits a SETUP message to call server. The SETUP message includes the E.164 address of the end user device connected to gateway 502. In step 2, call server 100 invokes an originating call half which executes a translation and returns a routing list of one or more entity addresses. An originating call half is a software entity that performs only originating call functions, such as digit collection and translation. The entity addresses in the routing list each include a call server ID and an endpoint ID for the endpoint to which the call is being made. In this example, since a call is being routed to an end user device connected to gateway 502, one of the entity addresses may contain the call server ID of call server 102 and the endpoint ID for a logical endpoint on gateway 502 corresponding to an end user device connected to gateway 502.

In step 3, call server 100 transmits an agent interworking protocol (AIP) initial address SETUP message including the endpoint ID for the endpoint to which the call is being made to call server 102. The AIP protocol is an application layer protocol used to transmit call signaling information between call servers. The AIP protocol is based on the ISDN user part (ISUP) protocol with extensions for communicating media capabilities and media stream management information between call servers of different protocols. A detailed description of AIP messaging is found in commonly-assigned co-pending U.S. patent application Ser. No. 09/506,945, entitled "Methods and Apparatus for Interworking Between Internet Protocol (IP) Telephony Protocols", filed on even date herewith, the disclosure of which is incorporated herein by reference in its entirety. Call server 100 might perform a lookup, such as a domain name system (DNS) lookup, using the call server ID of call server 102 to determine where to send the AIP terminating SETUP message. Alternatively, if a DNS lookup was previously performed, call server 100 can rely on a cached address for call server 102.

In step 4, in response to receiving the IAM message, call server 102 initiates a terminating call half and utilizes the endpoint ID received in the SETUP message to determine the call signaling transport address of the logical endpoint on gateway 502 corresponding to the called end user. device. A terminating call half is a software entity that performs only terminating call half functions, such as a trunk selection and alerting the called end user. Because call server 102 has the endpoint ID, the need for performing a second translation using the dialed digits is eliminated.

In step 5, after determining the call signaling transport address for the endpoint on gateway 502, call server 102 presents the call to the endpoint on gateway 502. Presenting the call to the endpoint on gateway 502 can include sending a SETUP message to gateway 502. The SETUP message contains media capabilities of gateway 500 or the endpoint connected to gateway 500. Gateway 502 can then alert the endpoint connected to gateway 502 of the incoming call and forward its media capabilities to gateway 500. Once the endpoints agree on a set of media capabilities, media stream communications can be established between end user devices.

As stated above, in the embodiment illustrated in FIG. 5, because call server 100 transmits the endpoint ID of the end user connected to gateway 502, no double translation is required. For example, without provisioning and communicating endpoint IDs between call servers, call server 100 would be required to perform a translation based on the dialed digits to determine the call server hosting the called end user. Call server 100 would then transmit the SETUP message including the dialed digits to call server 102. Call server 102 would then execute a translation based on the dialed digits to locate the endpoint to which the call was directed. Requiring two translations based on dialed digits decreases the efficiency of call processing among peer call servers. The present invention avoids these difficulties by using call server IDs and endpoint IDs to facilitate endpoint location. In addition, because call processing is distributed among multiple call servers, the load on each individual call server is lessened.

Centralized Call Processing Embodiment

In the embodiment illustrated in FIG. 5, network translation was distributed among multiple call servers. In the embodiment illustrated in FIG. 6, a network translation server 504 forms translations from the E.164 address to one or more entity addresses. Network translation server 504 includes software for receiving translation data from PTM 122, and generating a database from the translation data. Network translation server 504 also includes software, such as lightweight directory access protocol (LDAP) software, for providing the translation data to call servers in response to queries from the call servers. Network translation server can execute on any hardware platform suitable for network communications, such as a PC or a workstation.

Figure 6:
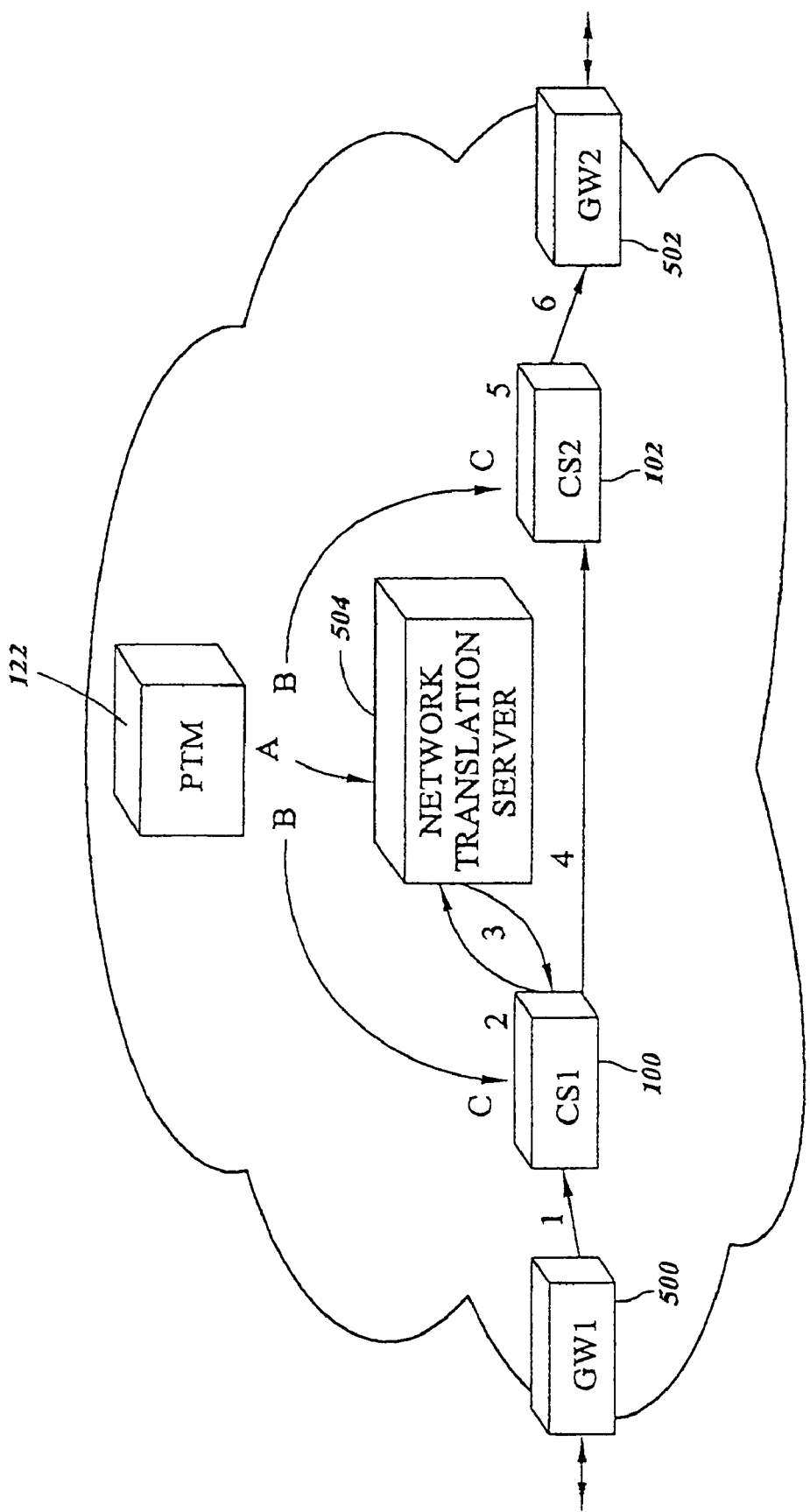
FIG. 6 is a call flow diagram illustrating call processing by peer call servers according to an alternative embodiment of the invention.

Referring to the call flow diagram in FIG. 6, in step A, PTM 122 transmits translation data to network translation server 504. In response to receiving the translation data, network translation server 504 generates a digilator tree that maps number ranges to addressable entity IDs, as previously described. In step B, PTM 122 sends configuration data for hosted endpoints to call servers 100 and 102. The configuration data includes the endpoint ID and configuration data for hosted endpoints. In step C, call servers 100 and 102 each build a digilator tree for hosted endpoints.

Call Flow

In step 1, originating endpoint gateway 500 transmits a SETUP message to call server 100. The SETUP message includes the E.164 address of gateway 502 (or a logical endpoint on gateway 502). In step 2, call server 100 implements an originating call half (OCH) agent, which executes a translation. In this example, the translation fails because the OCH agent fails to find an entry for call server 102 in the local database. Accordingly, in step 2, call server 100 transmits a query to network translation server 504. In response to the query, network translation server 504 performs a translation based on the dialed digits extracted from the query and obtains a list of entity addresses corresponding to the dialed digits. In step 3, network translation server 504 communicates the list to call server 100. In response to receiving the list, call server 100 selects a call server from the list, such as call server 102. In step 4, call server 100 transmits an AIP message including the endpoint ID for the called endpoint to call server 102. In step 5, call server 102 creates a terminating call half agent that uses the endpoint ID in conjunction with the local translation data for hosted endpoints to determine the call signaling transport address of gateway 502. In step 6, the terminating call half presents the call to terminating endpoint 502.

In the embodiment illustrated in FIG. 6, the translation data is stored in a centralized network translation server. This configuration facilitates updating of the translation data because the updating only has to be done in a single location. However, reliability is decreased over the embodiment illustrated in FIG. 5 where multiple call servers execute the translations. This configuration also facilitates scaling of the network by avoiding a linear growth in per call server translation data.

Transport Layer Communications between Call Servers

Figure 7:
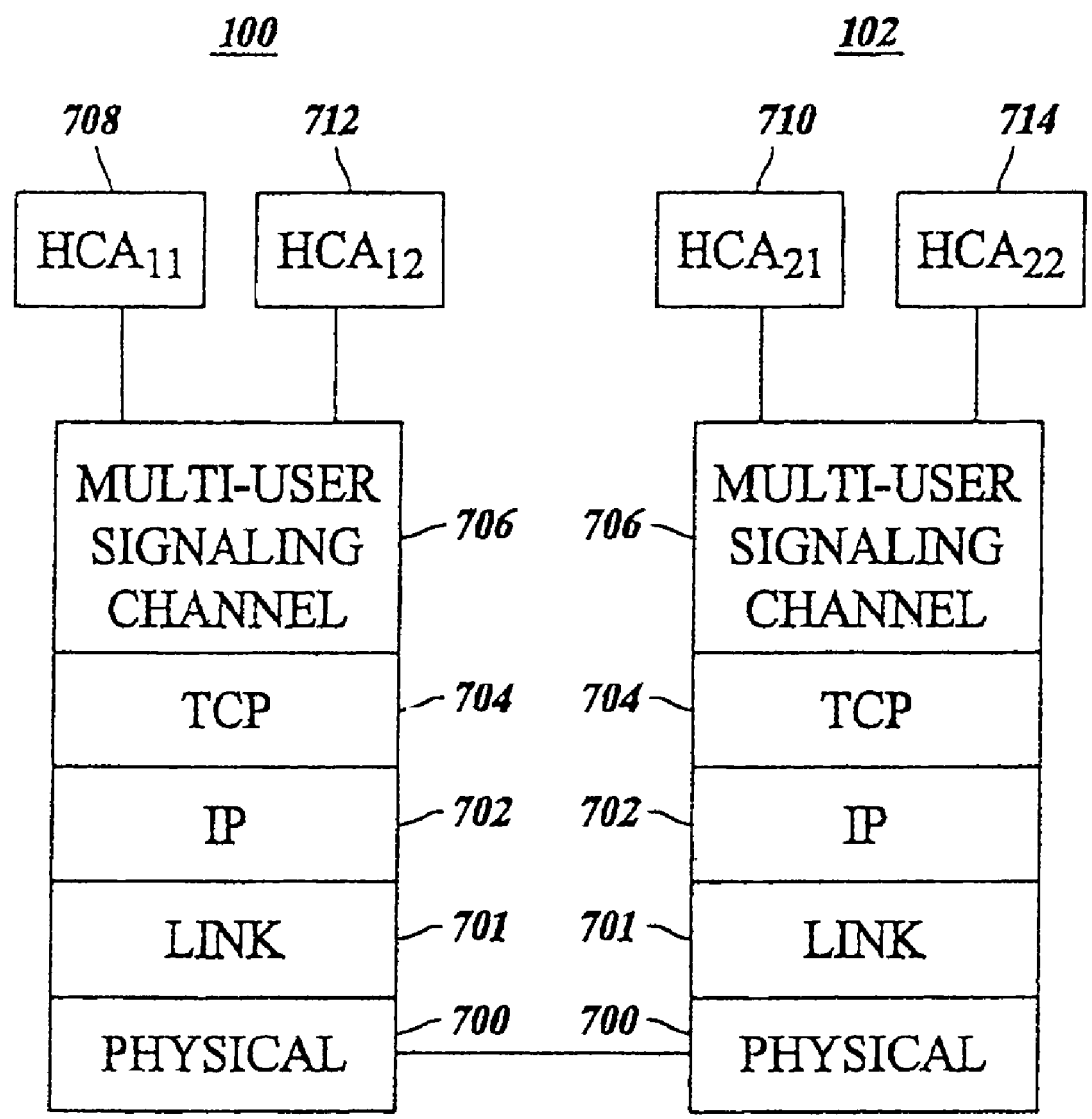
FIG. 7 is a protocol layer diagram illustrating multi-user transport layer communications between call servers according to an embodiment of the present invention.

As stated above, one of the principal advantages of the present invention is that it allows peer call servers to communicate with each other in processing a call. FIG. 7 illustrates transport layer communications among peer call servers according to an embodiment of the present invention. In FIG. 7, call servers 100 and 102 each include physical and data link layers 700 and 701 for performing lower-level communications functions, such as physical addressing and collision control. Network layer communications software can include IP software. Transport layer communication software 704 may include TCP or UDP software. In a preferred embodiment of the invention, transport layer software includes TCP software.

In conventional TCP communications, e.g., a call, a single TCP connection is utilized by a single application. This will limit the number of simultaneous calls in a call server since TCP connections are limited system resources. Opening and closing TCP connections will significantly impact system capacity. However, according to the present invention, multi-user signaling channels 706 are established between call servers in order to allow multiple calls to use the same TCP connection. Multi-user TCP channel software 706 multiplexes messages from a plurality of calls over a single signaling connection. For example, in the illustrated embodiment, a first TCP connection can be used to transport messages between half call agent$_{11}$ 708 and half call agent$_{21}$ 710 and messages between half call agent$_{12}$ 712 and half call agent$_{22}$ 714.

Multi-user TCP software 706 preferably executes according to the following rules.

If a multi-user TCP channel does not exist, create a multi-user TCP channel. If a multi-user TCP channels already exists, then use that channel. The multi-user TCP channels are not established among all possible call server pairs to reduce system start/restart time, and increase reliability, i.e., if one node fails, the TCP connection can be automatically re-established when needed.

Use no more than two multi-user TCP channels per call server pair. There may be two TCP channels because two call servers may simultaneously establish TCP connections to each other.

A single call does not use more than one TCP channel.

A multi-user TCP channel is taken down after a predetermined period of idle time.

These rules reduce the number of TCP connections for a given call or a given pair of call servers.

According to another aspect, the present invention includes methods for associating messages with half calls transmitted over multi-user TCP channels. For example, in FIG. 7, if half call agent$_{11}$ transmits a SETUP message to half call agent$_{21}$, the SETUP message preferably includes a half call ID. The call half ID includes an allocation bit that specifies whether or not the message originated from half call agent$_{11}$ 708. If the message originated from half call agent$_{11}$ 708, half call agent$_{11}$ 708 preferably sets the allocation bit. The half call ID preferably also includes a call counter that identifies the half call. For example, if this is the first call established by half call agent$_{11}$ 708 the counter may be set to 1. Accordingly, the call reference parameter for a call originated by half call agent$_{11}$ 708 may be equal to (1,1), where the first "1" is the allocation bit and the second "1" is the call counter. Half call agent$_{11}$ 708 transmits the half call ID to half call agent$_{21}$ 710 in a SETUP message. When half call agent$_{21}$ receives the SETUP message, half call agent$_{21}$ flips the allocation bit in the call reference parameter so that the call reference parameter is (0,1). Thus, the same call is identified by call reference parameter (1,1) by half call agent$_{11}$ 708 and call reference parameter (0,1) by half call agent$_{21}$ 710. In this manner, if another call agent associated with call server 102 attempts to create a call with the same call reference parameter as the call between half call agent$_{11}$ 708 and half call agent$_{21}$ 710, the messages will not be confused by the call servers. For example, half call agent$_{22}$ 714 might create a call reference parameter of (1,1) and transmit the call reference parameter to half call agent$_{12}$ on call server 100. Upon receiving the message, because the call half call agent$_{12}$ 712 on call server 100 did not originate the call, half call agent$_{12}$ flips the allocation bit in the call reference parameter, thus making the call reference parameter (0,1). In this manner, by toggling the allocation bit according to whether a call originated from a given half call agent, the half call agents according to the present invention avoid call reference parameter assignment conflicts. This conflict avoidance enables signaling for multiple calls to be sent over a single TCP connection.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for processing calls in a packet network using call servers, the method comprising:
   (a) receiving a SETUP message from a first gateway in the packet network, the SETUP message including a first address for a called endpoint;
   (b) executing a translation based on the first address to obtain at least one entity address, the at least one entity address including a unique call server identification (ID) and a unique endpoint identification (ID);
   (c) transmitting the at least one entity address to a call server specified by the unique call server ID; and
   (d) at the call server, locating a call signaling transport address for the called endpoint based on the unique endpoint ID,
   wherein executing the translation based on the first address includes utilizing a digilator tree to locate the at least one entity address.

2. The method of claim 1 wherein the first address is a numbering plan address.

3. The method of claim 1 wherein the call signaling transport address includes an interne protocol (IP) address and a port number for the called endpoint.

4. The method of claim 1 wherein transmitting the at least one entity address to the call server includes transmitting the at least one entity address over a multi-user transport control protocol (TCP) connection to the call server.

5. The method of claim 1 wherein locating the call signaling transport address based on the unique endpoint ID includes using the unique endpoint ID as a key to locate the call signaling transport address.

6. The method of claim 1, wherein a combination of the unique call server ID and the unique endpoint ID is itself unique within the packet network.

7. A method for processing calls in a packet network using call servers, the method comprising:
   (a) at a first call server, receiving a SETUP message from a first gateway in the packet network, the SETUP message including a first address corresponding to a called endpoint in the packet network;
   (b) formulating a query including the first address and transmitting the query to a network translation server;
   (c) at the network translation server, executing a translation to determine at least one entity address corresponding to the first address, the at least one entity address including a unique call server identification (ID) and a unique endpoint identification (ID) corresponding to the first address;
   (d) transmitting a response to the first call server, the response including the at least one entity address;
   (e) at the first call server, receiving the response, formulating a first call signaling message including the unique call server ID and the unique endpoint ID, and sending the first call signaling message to a second call server specified by the unique call server ID; and
   (f) at the second call server, receiving the first call signaling message and locating a call signaling transport address for the called endpoint based on the unique endpoint ID.

8. The method of claim 7 wherein formulating the query includes formulating a lightweight directory access protocol (LDAP) query.

9. The method of claim 7 wherein executing the translation to obtain the at least one entity address includes utilizing dialed digits in the SETUP message to traverse a digilator tree.

10. The method of claim 7 further comprising locating the call signaling transport address including locating an internet protocol (IP) address and a port number for the called endpoint.

11. The method of claim 7 wherein the first address is a numbering plan address.

12. The method of claim 7 wherein the first and second call servers comprise peer call servers.

13. The method of claim 7 wherein sending the first call signaling message to the second call server includes sending the first call signaling message over a multi-user Transmission Control Protocol (TCP) connection to the second call server.

14. The method of claim 7 wherein executing the translation includes utilizing a digilator tree to locate the at least one entity address.

15. The method of claim 7 wherein executing the translation includes using the unique endpoint ID as a key to locate the call signaling transport address.

* * * * *